US010191297B2

United States Patent
Yanagisawa

(10) Patent No.: US 10,191,297 B2
(45) Date of Patent: Jan. 29, 2019

(54) TILT ADJUSTING METHOD FOR MOVABLE BODY

(71) Applicant: NIDEC SANKYO CORPORATION, Suwa-gun, Nagano (JP)

(72) Inventor: Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 209 days.

(21) Appl. No.: 15/386,539

(22) Filed: Dec. 21, 2016

(65) Prior Publication Data

US 2017/0176767 A1    Jun. 22, 2017

(30) Foreign Application Priority Data

Dec. 21, 2015   (JP) .................................. 2015-248437

(51) Int. Cl.
    *G02B 27/64*    (2006.01)
    *G03B 5/00*     (2006.01)

(52) U.S. Cl.
    CPC ............ *G02B 27/646* (2013.01); *G03B 5/00* (2013.01); *G03B 2205/0023* (2013.01); *G03B 2205/0069* (2013.01)

(58) Field of Classification Search
    None
    See application file for complete search history.

(56) References Cited

U.S. PATENT DOCUMENTS

| 2015/0264240 A1* | 9/2015 | Chan ...................... G02B 7/102 |
| | | 348/208.7 |
| 2015/0277140 A1* | 10/2015 | Minamisawa ......... G02B 7/023 |
| | | 359/557 |
| 2016/0341974 A1* | 11/2016 | Kishine .................. G03B 43/00 |

FOREIGN PATENT DOCUMENTS

JP    2015064501 A    4/2015

* cited by examiner

*Primary Examiner* — Derek S Chapel
(74) *Attorney, Agent, or Firm* — Cantor Colburn LLP

(57) ABSTRACT

A movable body may be in a unit with a shake correction function having a movable body, a fixed body provided with a support mechanism structured to swingably support the movable body, a shake correction drive mechanism, and an elastic support member which connects the movable body with the fixed body. A tilt adjusting method for the movable body may include setting a state that a force having a component on an opposite direction to a driving force of the shake correction drive mechanism is acted on the movable body, adjusting the driving force so that a tilt direction of the movable body is substantially coincided with a target direction, and connecting the movable body with the fixed body through the elastic support member in a state that the tilt direction of the movable body is substantially coincided with the target direction.

16 Claims, 10 Drawing Sheets

TILT ADJUSTING METHOD FOR MOVABLE BODY

CROSS REFERENCE TO RELATED APPLICATION

The present invention claims priority under 35 U.S.C. § 119 to Japanese Application No. 2015-248437 filed Dec. 21, 2015, the entire content of which is incorporated herein by reference.

FIELD OF THE INVENTION

At least an embodiment of the present invention may relate to a tilt adjusting method for a movable body in a unit with a shake correction function which includes a movable body, a fixed body provided with a support mechanism swingably supporting the movable body, and a shake correction drive mechanism structured to restrain a shake of hand and a swing of the movable body.

BACKGROUND

Various optical devices on which an optical unit for photographing is mounted have been conventionally used. The optical unit includes a shake correction drive mechanism structured to swing the optical module for correcting a shake in order to restrain disturbance of a photographed image due to a shake of hand and a swing. This type of optical unit with a shake correction function is disclosed in Japanese Patent Laid-Open No. 2015-64501. An optical unit with a shake correction function described in the Patent Literature includes a gimbal mechanism disposed between a movable body and a fixed body as a support mechanism for swingably supporting the movable body on which an optical module is mounted with respect to a case (fixed body).

An optical unit with a shake correction function is desirable that, in a stationary state that a shake correction drive mechanism is not driven, a deviation (stationary tilt) between an optical axis of an imaging element provided on a fixed body and an optical axis of an optical system provided in a movable body is small. Further, in a case that members which structure an optical system are divided into the movable body side and the fixed body side, a deviation of an attitude of the movable body in a stationary state that a shake correction is not performed with respect to the fixed body also affects performance of the optical system itself in addition to a degree of the deviation of the optical axis. Therefore, it is desirable to perform a tilt adjustment of the movable body with respect to the fixed body with a high degree of accuracy in a stationary state that a shake correction is not performed.

The optical unit with a shake correction function described in the Patent Literature includes a plate-shaped spring (elastic support member) which is attached between the movable body and the fixed body in addition to a gimbal mechanism swingably supporting the movable body on which an optical module is mounted. In this case, an attitude of the movable body in a stationary state is determined by the plate-shaped spring. The plate-shaped spring is provided with a fixed body side fixing part which is fixed to the fixed body and a movable body side fixing part which is fixed to the movable body, and the movable body side fixing part is structured so that an attaching position of the movable body is capable of being adjusted. Specifically, there is a gap space between the movable body side fixing part and the movable body and thus the movable body can be moved within a range of the gap space to adjust the attaching position of the movable body. In this structure, in order to reduce a deviation between an attitude of the movable body and an attitude of the fixed body in a stationary state, it is required that a tilt adjustment of the movable body is performed with a high degree of accuracy when the movable body is to be fixed to the plate-shaped spring.

SUMMARY

In view of the problem described above, at least an embodiment of the present invention may advantageously provide a tilt adjusting method for a movable body in a unit with a shake correction function including the movable body, a fixed body provided with a support mechanism swingably supporting the movable body, and a shake correction drive mechanism structured to restrain a shake of hand or a swing of the movable body, the tilt adjusting method being capable of adjusting a tilt of the movable body with respect to the fixed body with a high degree of accuracy.

According to at least an embodiment of the present invention, there may be provided a tilt adjusting method for a movable body in a unit with a shake correction function including the movable body, a fixed body provided with a support mechanism structured to swingably support the movable body, a shake correction drive mechanism structured to swing the movable body with respect to the fixed body, and an elastic support member which connects the movable body with the fixed body. The tilt adjusting method for the movable body includes a first process which sets a state that a force having a component on an opposite direction to a driving force of the shake correction drive mechanism is acted on the movable body, a second process which adjusts the driving force so that a tilt direction of the movable body is coincided with a target direction, and a third process which connects the movable body with the fixed body through the elastic support member in a state that the tilt direction of the movable body is substantially coincided with the target direction.

According to at least an embodiment of the present invention, a shake correction drive mechanism previously provided in an inside of the unit for performing a shake correction of the movable body is used to make a tilt direction of the movable body coincide with a target direction and, in a state that the tilt direction of the movable body is coincided with the target direction, the elastic support member and the movable body are fixed to each other. In this case, first, movement of the movable body is restricted. Specifically, a state is set that a force having a component in an opposite direction to a driving force of the shake correction drive mechanism (force in an opposite direction with respect to the driving force of the shake correction drive mechanism) is acted on the movable body and thus, a state is set that a force larger than this force is required for moving the movable body and, after that, the shake correction drive mechanism is driven to adjust a tilt of the movable body. In other words, an unbalanced load is applied to the movable body to make the movable body tilt and then, a driving force of the shake correction drive mechanism is acted on the movable body in an opposite direction with respect to the tilt and the tilt direction of the movable body is adjusted so as to coincide with a target direction, and the elastic support member and the movable body are connected with each other in a state that the tilt direction of the movable body is coincided with the target direction. According to this method, when a driving force of the shake correction drive mechanism is applied, the movable body is prevented from being largely moved by a small force and thus variation of a tilt of the movable body is restrained. Therefore, a tilt adjustment of the movable body can be performed with a high degree of accuracy. Further, a tilt adjustment of the movable body is performed by the shake correction drive mechanism previously provided in an inside of the unit and thus, in comparison with a method in which the movable body is moved by using an external drive mechanism, factors which cause variation of a tilt of the movable body can be reduced. Therefore, a tilt adjustment of the movable body is stably performed with a high degree of accuracy.

In at least an embodiment of the present invention, it is desirable that, in the first process, an unbalanced load is applied to the movable body in a direction different from a direction directing to a gravity center of the movable body. According to this method, the movable body is tilted by the unbalanced load and thus a tilt adjustment is started from a state that the movable body has been inclined. Therefore, when a driving force is applied by the shake correction drive mechanism, the movable body is restrained from being largely moved in such a degree exceeding the target position. Accordingly, variation of a tilt of the movable body is restrained and a tilt adjustment of the movable body can be performed with a high degree of accuracy.

In at least an embodiment of the present invention, in the first process, a spring load is applied to the movable body. Alternatively, a load of a weight is applied to the movable body. Alternatively, a repulsive force or an attraction force acted between a first magnet held by the movable body and a second magnet which faces the first magnet is applied to the movable body. When an unbalanced load is applied in these methods, movement of the movable body is restricted with a simple structure. Therefore, when a driving force of the shake correction drive mechanism is applied, the movable body is prevented from being largely moved by a small force and thus variation of a tilt of the movable body is restrained. Accordingly, a tilt adjustment of the movable body can be performed with a high degree of accuracy.

In at least an embodiment of the present invention, it is desirable that, in the third process, the movable body and the elastic support member are fixed to each other by using a UV-curing adhesive and, while the UV-curing adhesive is applied and curing processing for the UV-curing adhesive is performed, the shake correction drive mechanism is controlled so as to maintain a state that the unbalanced load and the driving force are balanced with each other. According to this method, displacement of the position of the movable body due to variation of a force applied to its fixed portion when the UV-curing adhesive is cured can be restrained.

In at least an embodiment of the present invention, it is desirable that, in the second process, the tilt direction of the movable body is measured by detecting a measurement light reflected by the movable body. When an optical type tilt measuring method is used as described above, in comparison with a contact type tilt measuring method, factors of a positional displacement of the movable body can be reduced. Therefore, a tilt adjustment of the movable body can be performed with a high degree of accuracy.

In at least an embodiment of the present invention, it is desirable that the shake correction drive mechanism includes a coil and a magnet and, in the second process, the tilt direction of the movable body is measured and, based on a deviation between the tilt direction being measured and the target direction, feedback control which controls a drive current supplied to the coil is performed. According to this method, a tilt direction of the movable body can be coincided with the target direction through an automatic adjustment. Therefore, a tilt adjustment of the movable body can be performed easily. In this case, it may be adjusted that, in the first process, an unbalanced load is applied to the movable body in a direction different from a direction directing to a gravity center of the movable body to tilt the movable body and, in the second process, the driving force is applied to the movable body by the shake correction drive mechanism in a direction opposite to the tilt direction due to the unbalanced load of the movable body to adjust so that the tilt direction of the movable body is substantially coincided with the target direction and, in the third process, the movable body and the elastic support member are fixed to each other in a state that movement of the movable body is restricted by the unbalanced load applied in the first process and the driving force of the shake correction drive mechanism applied in the second process.

In at least an embodiment of the present invention, it is desirable that the support mechanism swingably supports the movable body in two swing directions, i.e., a swing direction around a first direction intersecting a center axial line of the fixed body and a swing direction around a second direction intersecting the center axial line and the first direction, the shake correction drive mechanism includes a first drive mechanism structured to swing the movable body around the first direction and a second drive mechanism structured to swing the movable body around the second direction and, in the first process, at least one of a first load which tilts the movable body around the first direction and a second load which tilts the movable body around the second direction is applied to the movable body to tilt the movable body and, in the second process, the first drive mechanism and the second drive mechanism are controlled to adjust a tilt direction around the first direction and a tilt direction around the second direction of the movable body so that the tilt direction of the movable body is substantially coincided with the target direction and, in the third process, the elastic support member is attached so as to support the movable body in a relatively movable state in the first direction and the second direction with respect to the fixed body. According to this method, in a case that an optical module is mounted on the movable body, an optical axis direction of the optical module can be set in the target direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

Figure 1:
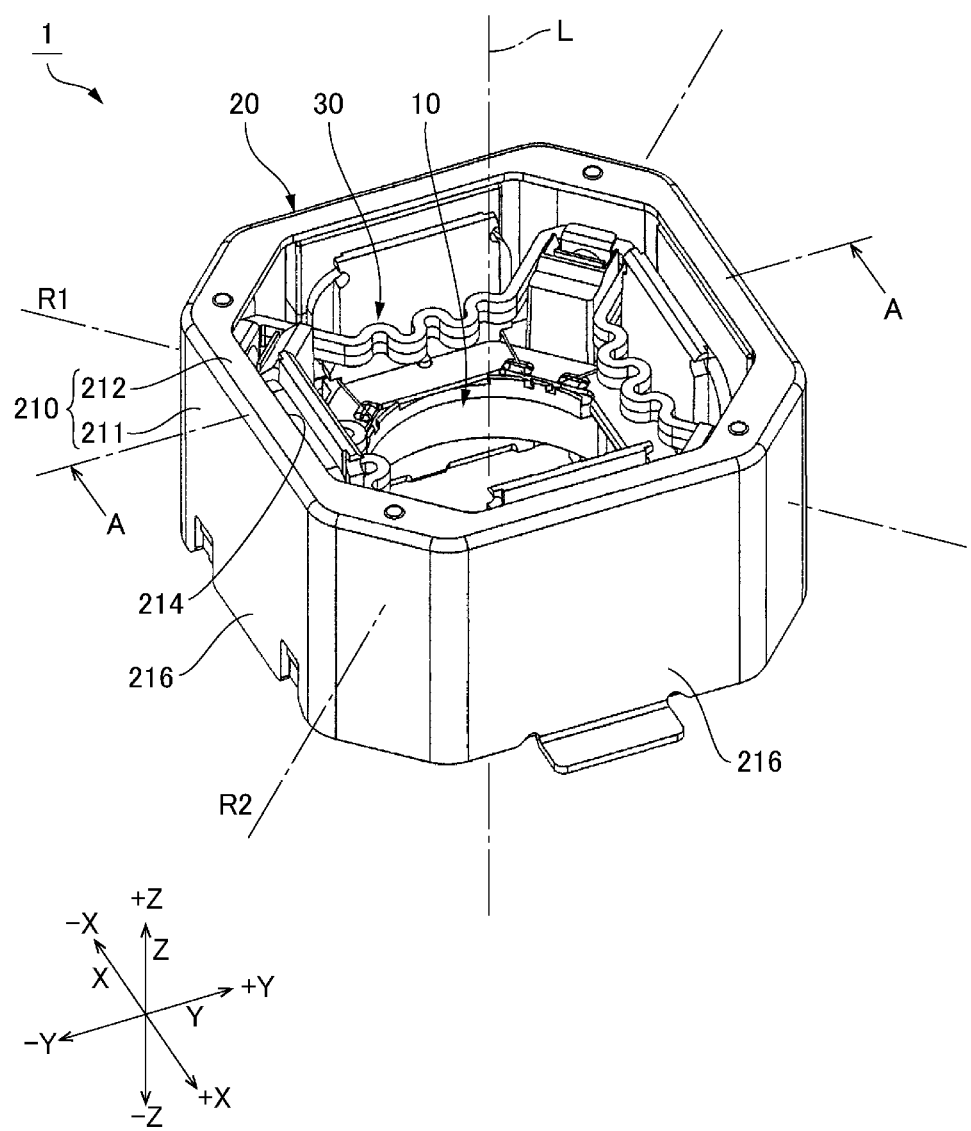
FIG. 1 is a perspective view showing a unit with a shake correction function in accordance with an embodiment of the present invention.
Figure 2:
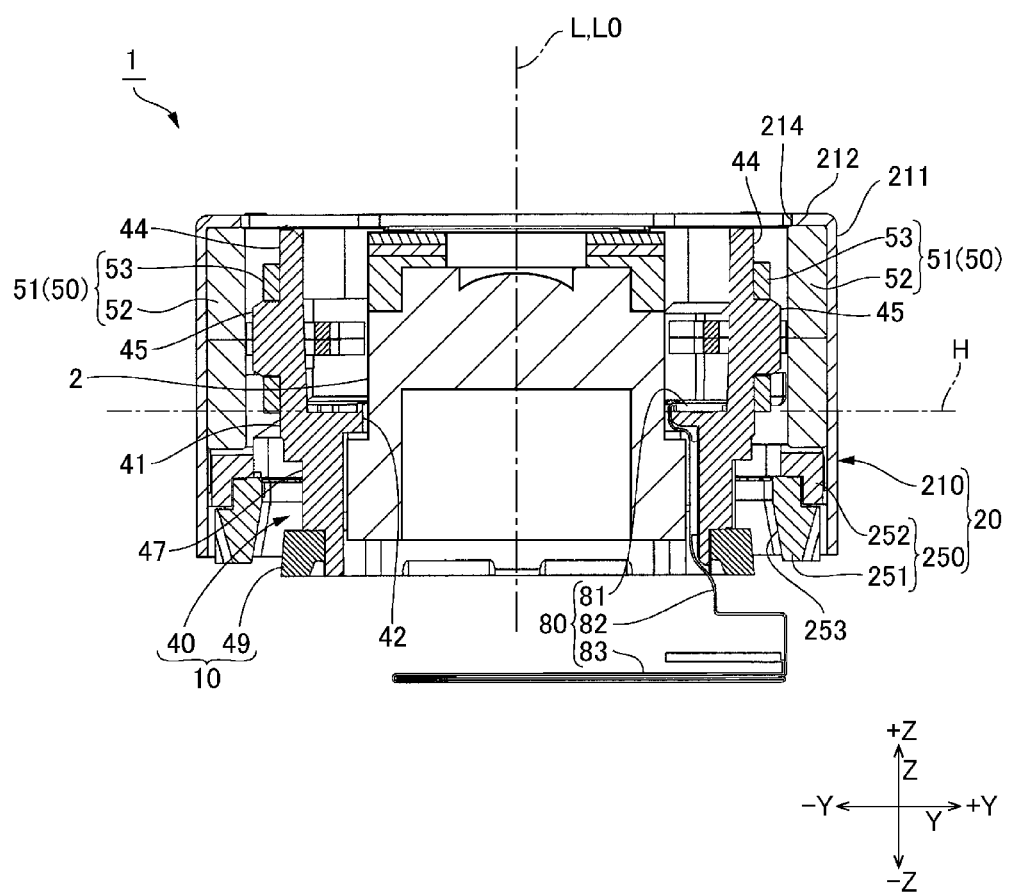
FIG. 2 is a cross-sectional view showing a unit with a shake correction function in FIG. 1.

At least an embodiment of a tilt adjusting method for a movable body in a unit with a shake correction function will be described below with reference to the accompanying drawings. FIG. 1 is a perspective view showing a unit with a shake correction function and FIG. 2 is a cross-sectional view ("A-A" cross-sectional view in FIG. 1) showing a unit with a shake correction function. An optical module 2 (see FIG. 2) is mounted on a unit 1 with a shake correction function shown in FIGS. 1 and 2. The unit 1 with a shake correction function on which the optical module 2 is mounted is used in an optical device such as a cell phone with a camera and a drive recorder or in an optical device such as an action camera mounted on a helmet, a bicycle, a radio-controlled helicopter and the like or a wearable camera. In the optical device, when a shake is occurred at the time of photographing, in order to prevent disturbance in a photographed image, the unit 1 with a shake correction function is driven to correct the shake.

In the present specification, three axes of "X", "Y" and "Z" are directions perpendicular to each other. One side in the "X"-axis direction is indicated as "+X", the other side is indicated as "−X", one side in the "Y"-axis direction is indicated as "+Y", the other side is indicated as "−Y", one side in the "Z"-axis direction is indicated as "+Z", and the other side is indicated as "−Z". The "Z"-axis direction is a center axial line "L" of the unit 1 with a shake correction function. The center axial line "L" direction is a direction which is to be coincided with an optical axis "L0" (see FIG. 2) of an optical module 2 when the optical module 2 is mounted on the unit 1 with a shake correction function. Further, the "−Z" direction is an image side in the optical axis "L0" direction and the "+Z" direction is a direction on an object side in the optical axis "L0" direction. A turning around the "X"-axis of the unit 1 with a shake correction function corresponds to a so-called pitching (vertical swing) and a turning around the "Y"-axis corresponds to a so-called yawing (lateral swing). Further, a turning around the "Z"-axis corresponds to a so-called rolling.

Figure 3:
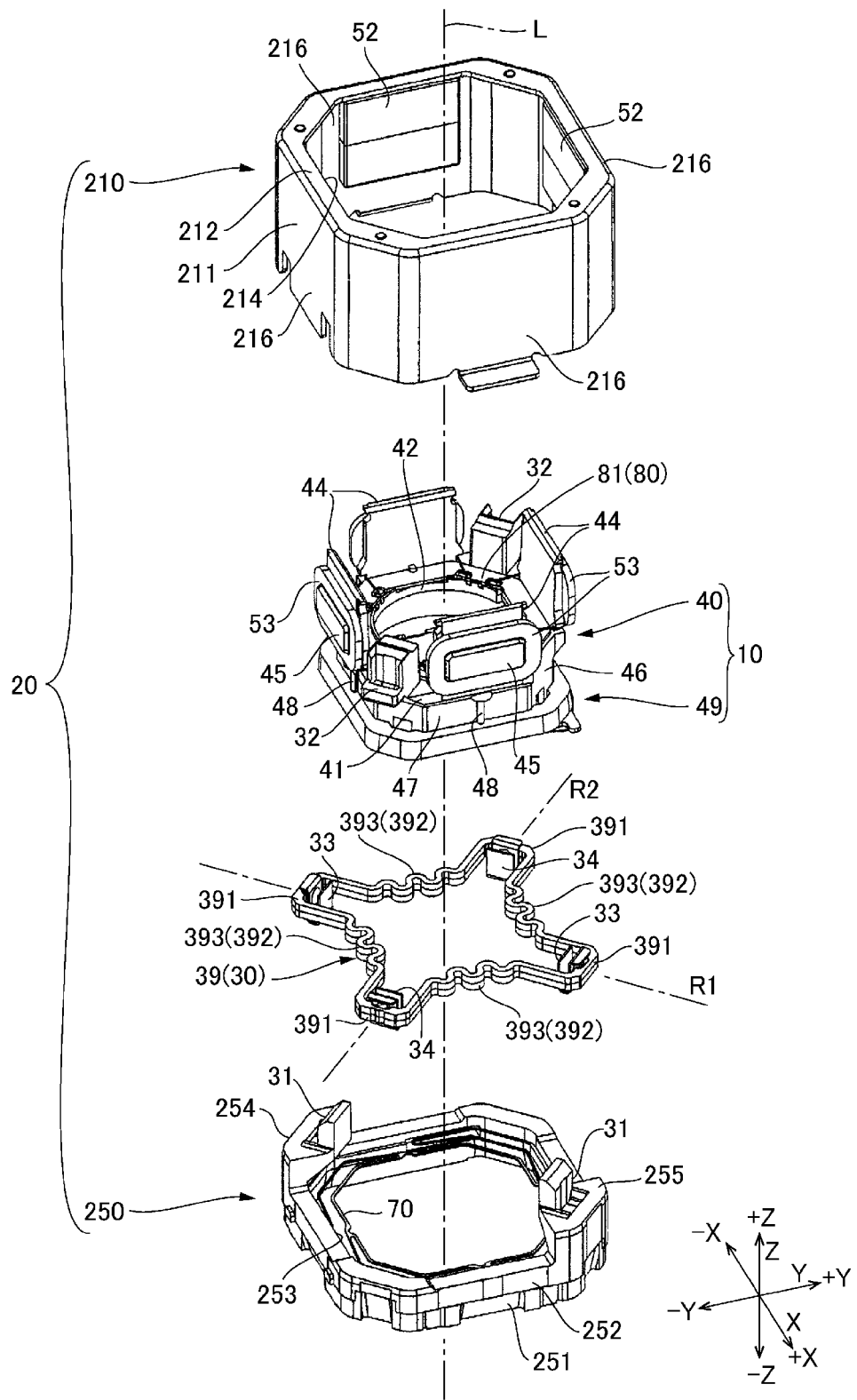
FIG. 3 is an exploded perspective view showing a unit with a shake correction function in FIG. 1.

FIG. 3 is an exploded perspective view showing the unit 1 with a shake correction function. As shown in FIGS. 2 and 3, the unit 1 with a shake correction function includes a movable body 10, a fixed body 20, a support mechanism 30 structured to swingably support the movable body 10 with respect to the fixed body 20, a shake correction drive mechanism 50 structured to generate a magnetic-drive force for relatively displacing the movable body 10 with respect to the fixed body 20, an elastic support member 70 which connects the movable body 10 with the fixed body 20, and a flexible circuit board 80. The unit 1 with a shake correction function is electrically connected with a host control device provided on a main body side of an optical device on which the unit 1 with a shake correction function is mounted through the flexible circuit board 80. The control device is inputted with an output of a gyroscope (shake detection sensor) configured to detect a shake when the shake is generated in the optical device. The control device drives the shake correction drive mechanism 50 based on an output of the gyroscope and swings the movable body 10 to perform a shake correction.

The movable body 10 is swingably supported by the support mechanism 30 around the first axial line "R1" (see FIG. 1) which intersects the center axial line "L" and is swingably supported around the second axial line "R2" (see FIG. 1) which intersects the center axial line "L" and the first axial line "R1". The first axial line "R1" and the second axial line "R2" are diagonal directions of the fixed body 20 and are perpendicular to the center axial line "L". Further, the first axial line "R1" and the second axial line "R2" are perpendicular to each other. Although the first axial line "R1" and the second axial line "R2" are directions intersecting the "X"-axis and the "Y"-axis, a swing around the first axial line "R1" and a swing around the second axial line "R2" of the movable body 10 are converted into movements combined of a swing around the "X"-axis with a swing around the "Y"-axis of the movable body 10. In other words, the support mechanism 30 swingably supports the movable body 10 around the "X"-axis and around the "Y"-axis.

(Fixed Body)

The fixed body 20 includes a first case 210 whose outward shape is a substantially square when viewed in the "Z"-axis direction and a second case 250 which is attached to the first case 210 from the "−Z" direction side. The first case 210 is fixed to the second case 250 by welding or the like. The first case 210 is provided with a body part 211 in a rectangular tube shape which surrounds the movable body 10 and an end plate part 212 in a rectangular frame shape which is projected to an inner side from an end part in the "+Z" direction of the body part 211. A window 214 is formed at a center of the end plate part 212. The body part 211 is provided with side plate parts 216 which are located in respective directions of the "+X" direction side, the "−X" direction side, the "+Y" direction side and the "−Y" direction side.

The second case 250 is structured of two members, i.e., a first member 251 in a rectangular frame shape and a second member 252 in a rectangular frame shape which is attached on the "+Z" direction side of the first member 251. The second case 250 is provided with a rectangular opening part 253. An elastic support member 70 which connects the movable body 10 with the fixed body 20 is disposed on an inner peripheral side of the opening part 253. The elastic support member 70 is a plate-shaped spring. The second member 252 is provided with side wall parts 254 and 255 which are stood up to the "+Z" direction from diagonal positions on the first axial line "RI". The side wall parts 254 and 255 are formed with first contact point spring holding parts 31 which structure a first swing support part 36 of the support mechanism 30.

(Shake Correction Drive Mechanism)

Figure 4A:
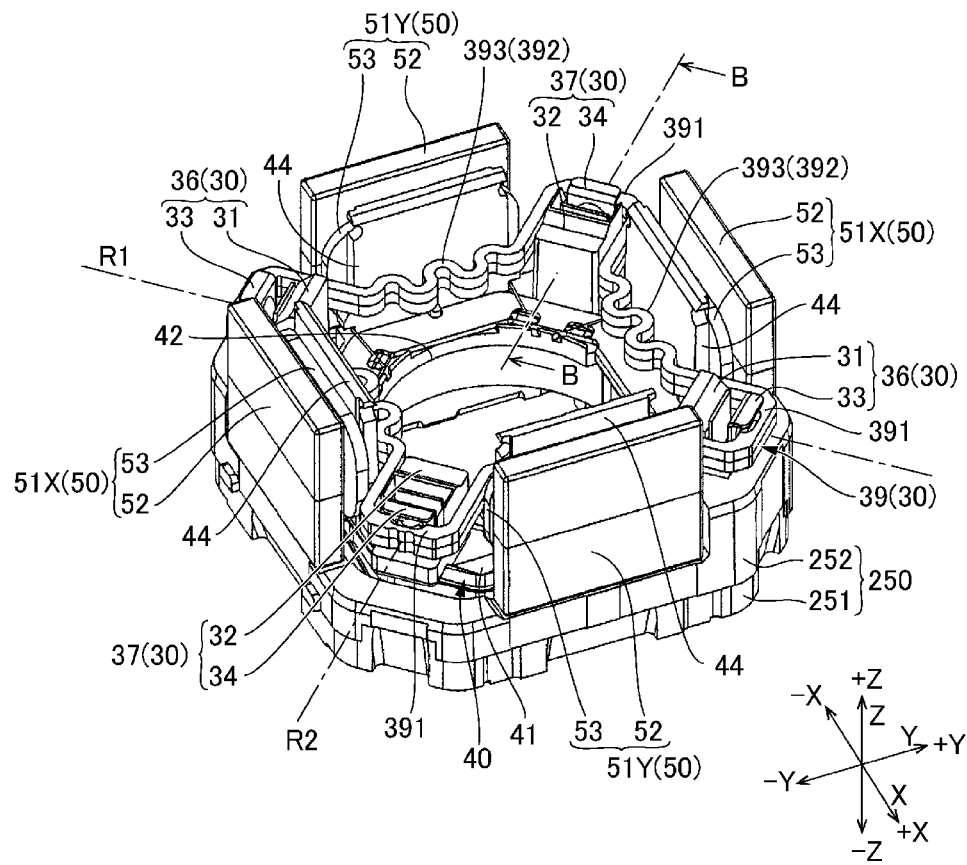
FIGS. 4A and 4B are explanatory views showing a support mechanism and a shake correction drive mechanism.
Figure 4B:
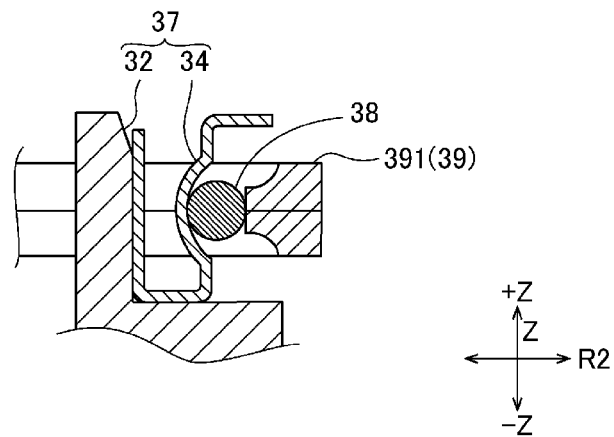

FIGS. 4A and 4B are explanatory views showing the support mechanism 30 and a shake correction drive mechanism 50. FIG. 4A is a perspective view showing a state that the first case 210 is detached from the unit 1 with a shake correction function, and FIG. 4B is a cross-sectional view showing a swing support part 37 ("B-B" cross-sectional view in FIG. 4A). The shake correction drive mechanism 50 includes four magnetic drive mechanisms 51 provided between the fixed body 20 and the movable body 10. Each of the magnetic drive mechanisms 51 includes a magnet 52 and a coil 53. The coil 53 is an air-core coil. The coil 53 is held by side faces on the "+X" direction side and the "−X" direction side of the movable body 10 and side faces on the "+Y" direction side and the "−Y" direction side of the movable body 10. As shown in FIGS. 2 and 3, the magnet 52 is held by inner faces of side plate parts 216 of the body part 211 of the first case 210 which are located on the "+X" direction side, the "−X" direction side, the "+Y" direction side and the "−Y" direction side. Therefore, the magnet 52 and the coil 53 are faced each other between the movable body 10 and the body part 211 of the first case 210 on each of the "+X" direction side, the "−X" direction side, the "+Y" direction side and the "−Y" direction side.

The magnet 52 is magnetized so that a pole of an outer face side contacting with the body part 211 and a pole of an inner face side facing the coil 53 are different from each other. Further, the magnet 52 is divided into two pieces in the center axial line "L" direction (in other words, in the "Z"-axis direction) and the magnetic poles on the inner face side are magnetized so as to be different from each other with the divided position as a boundary. Therefore, the coil 53 is utilized so that its long side portions on the upper and lower sides are effective sides. Magnetized patterns of four magnets are the same as each other on their outer face sides and their inner face sides. The first case 210 is structured of magnetic material and functions as a yoke for the magnets 52.

As shown in FIG. 4A, the magnetic drive mechanism 51 includes a first magnetic drive mechanism 51X comprised of two sets of the magnet 52 and the coil 53 located on the "+Y" direction side and the "−Y" direction side of the movable body 10, and a second magnetic drive mechanism 51Y comprised of two sets of the magnet 52 and the coil 53 located on the "+X" direction side and the "−X" direction side of the movable body 10. Two coils 53 structuring the first magnetic drive mechanism 51X are wired and connected so that magnetic-drive forces are generated in the same direction around the "X"-axis when energized. Further, two coils 53 structuring the second magnetic drive mechanism 51Y are wired and connected so that magnetic-drive forces are generated in the same direction around the "Y"-axis when energized. Therefore, when an electric current is supplied to the coils 53 of the first magnetic drive mechanism 51X, a turning force in the same direction around the "X"-axis is applied to the movable body 10 at two opposed positions in the "Y"-axis direction interposing the movable body 10. Further, when an electric current is supplied to the coils 53 of the second magnetic drive mechanism 51Y, a turning force in the same direction around the "Y"-axis is applied to the movable body 10 at two opposed positions in the "X"-axis direction interposing the movable body 10. Therefore, when an electric current is supplied to the coils 53 of the first magnetic drive mechanism 51X, a shake correction in a pitching (vertical swing) direction is performed. Further, when an electric current is supplied to the coils 53 of the second magnetic drive mechanism 51Y, a shake correction in a yawing (lateral swing) direction is performed.

(Movable Body)

As shown in FIGS. 2 and 3, the movable body 10 includes a holder 40 to which an optical module 2 is attached, and a frame-shaped stopper 49 which is attached to an end part in the "−Z" direction of the holder 40. The stopper 49 is structured to abut with an inner peripheral face of the second case 250 of the fixed body 20 to restrict a swing range of the movable body 10 when the movable body 10 is largely swung. The holder 40 is provided with a frame part 41 whose planar shape when viewed in the "Z"-axis direction is a substantially square. A circular holding hole 42 for disposing the optical module 2 is formed at a center of the frame part 41. When the optical module 2 is to be fixed to the holder 40, the optical module 2 is abutted with a reference surface "H" provided in the holder 40 in the "Z"-axis direction and positioned.

As shown in FIG. 3, each of side end edges on the "+X" direction side, the "−X" direction side, the "+Y" direction side and the "−Y" direction side of the frame part 41 is disposed with a wall part 44 which is stood up in the "+Z" direction. The wall parts 44 are disposed so as to surround an outer peripheral side of the holding hole 42 and are extended in a straight line shape in the "X"-axis direction or the "Y"-axis direction at centers of the respective side end edges of the frame part 41. Each of four wall parts 44 is provided with a coil holding part 45 formed on its outer side face which faces on an opposite side to the holding hole 42. The coil holding part 45 is a rectangular protruded part to which the coil 53 of the magnetic drive mechanism 51 is attached. As shown in FIG. 2, the coil holding part 45 is protruded to a side of the magnet 52 from the center of the coil 53 and faces the magnet 52. When the movable body 10 is largely displaced in the "X"-axis direction or the "Y"-axis direction due to a swing, the coil holding part 45 is abutted with the magnet 52 to restrict a moving range of the movable body 10.

A flexible circuit board 80 for power feeding to the coils 53 is attached to the frame part 41. The flexible circuit board 80 is provided with a rectangular frame portion 81 which is extended along an inner peripheral side of four wall parts 44, a leading-around part 82 in a strip shape which is extended in the "−Z" direction from an inner peripheral edge of the rectangular frame portion 81 through the holding hole 42, and a flat plate-shaped portion 83 provided at an end part in the "−Z" direction of the leading-around part 82. The rectangular frame portion 81 is connected with four coils 53. The flat plate-shaped portion 83 is located on the "−Z" direction side with respect to the opening part 253 of the second case 250 and is connected with an electronic component provided in the optical module 2.

A cut-out part 46 which is cut out by a perpendicular face with respect to the first axial line "R1" is provided at diagonal positions on the first axial line "R1" of the frame part 41. When the movable body 10 is assembled to the fixed body 20, the side wall parts 254 and 255 provided at the diagonal positions on the first axial line "R1" of the second case 250 are disposed to the cut-out parts 46. Therefore, the first contact point spring holding parts 31 provided in the side wall parts 254 and 255 are disposed at the diagonal positions on the first axial line "R1" of the frame part 41. Further, the second contact point spring holding parts 32 structuring the second swing support parts 37 of the support mechanism 30 are formed at diagonal positions on the second axial line "R2" of the frame part 41.

An outer peripheral face of the frame part 41 is formed in a step shape at a midway position in the "Z"-axis direction on each of the faces on the "+X" direction side, the "−X" direction side, the "+Y" direction side, and the "−Y" direction side. In other words, as shown in FIGS. 2 and 3, a step part 47 which is recessed to an inner peripheral side is provided on a portion on the "−Z" direction side of the outer peripheral face of the frame part 41. A stopper 49 is attached to an end part in the "−Z" direction of the step part 47. The step part 47 is provided with fixing protruded parts 48 which are formed at centers of respective faces which face on the "+X" direction side, the "−X" direction side, the "+Y" direction side and the "−Y" direction side. The fixing protruded part 48 is extended in a straight line shape in the "Z"-axis direction and functions as an engaging part with which an elastic support member 70 is engaged.

(Support Mechanism)

The support mechanism 30 which swingably supports the movable body 10 with respect to the fixed body 20 is structured between the second case 250 and the holder 40. In this embodiment, a gimbal mechanism is used as the support mechanism 30. The support mechanism 30 (gimbal mechanism) includes, when the movable body 10 is assembled to the fixed body 20, first swing support parts 36 which are disposed at two positions separated from each other in the first axial line "R1" direction, second swing support parts 37 which are disposed at two positions separated from each other in the second axial line "R2" direction, and a movable frame 39 which is supported by the first swing support parts 36 and the second swing support parts 37.

As shown in FIGS. 3 and 4A, the movable frame 39 is a roughly rectangular gimbal spring. The movable frame 39 is provided with supporting point parts 391 which are provided at four positions around the center axial line "L", and connecting parts 392 which connect adjacent supporting point parts 391 with each other around the center axial line "L". A metal spherical body 38 is fixed on an inner side face of each of the supporting point parts 391 by welding or the like. A convex surface in a hemispheric shape which faces the center of the movable frame 39 is provided by the spherical body 38 at each of the supporting point parts 391. The connecting part 392 is provided with a meandering part 393 extended in the "X"-axis direction or the "Y"-axis direction and is elastically deformable in a direction perpendicular to the center axial line "L".

The first swing support part 36 includes the first contact point spring holding part 31 provided in the second case 250 of the fixed body 20 and a first contact point spring 33 which is held by the first contact point spring holding part 31. The first contact point spring 33 is a metal plate spring which is bent in a "U"-shape. The first swing support parts 36 are disposed on inner sides of the supporting point parts 391 provided at diagonal positions in the first axial line "R1" direction and support the movable frame 39 through the first contact point springs 33 attached in an elastically deformable state in the first axial line "R1" direction.

The second swing support part 37 includes a second contact point spring holding part 32 provided in the holder 40 of the movable body 10, and a second contact point spring 34 which is held by the second contact point spring holding part 32. The second contact point spring 34 is a metal plate spring which is bent in a "U"-shape and has the same shape as the first contact spring 33. The second swing support part 37 supports the movable frame 39 through the second contact point spring 34 which is attached in an elastically deformable state in the second axial line "R2" direction.

The first contact point spring 33 of the first swing support part 36 and the second contact point spring 34 of the second swing support part 37 are respectively formed with a contact point part in a hemispheric shape which is contacted with the spherical body 38 welded to the supporting point part 391. The supporting point parts 391 of the movable frame 39 provided at four points around the center axial line "L" are supported so that the hemispheric contact point parts of the first contact point spring 33 and the second contact point spring 34 and the spherical bodies 38 are point-contacted with each other and, in this manner, the movable frame 39 is supported. Therefore, the movable frame 39 is supported in a turnable state in each of two directions perpendicular to the center axial line "L" direction (first axial line "R1" direction and second axial line "R2" direction).

(Elastic Support Member)

Figure 5:
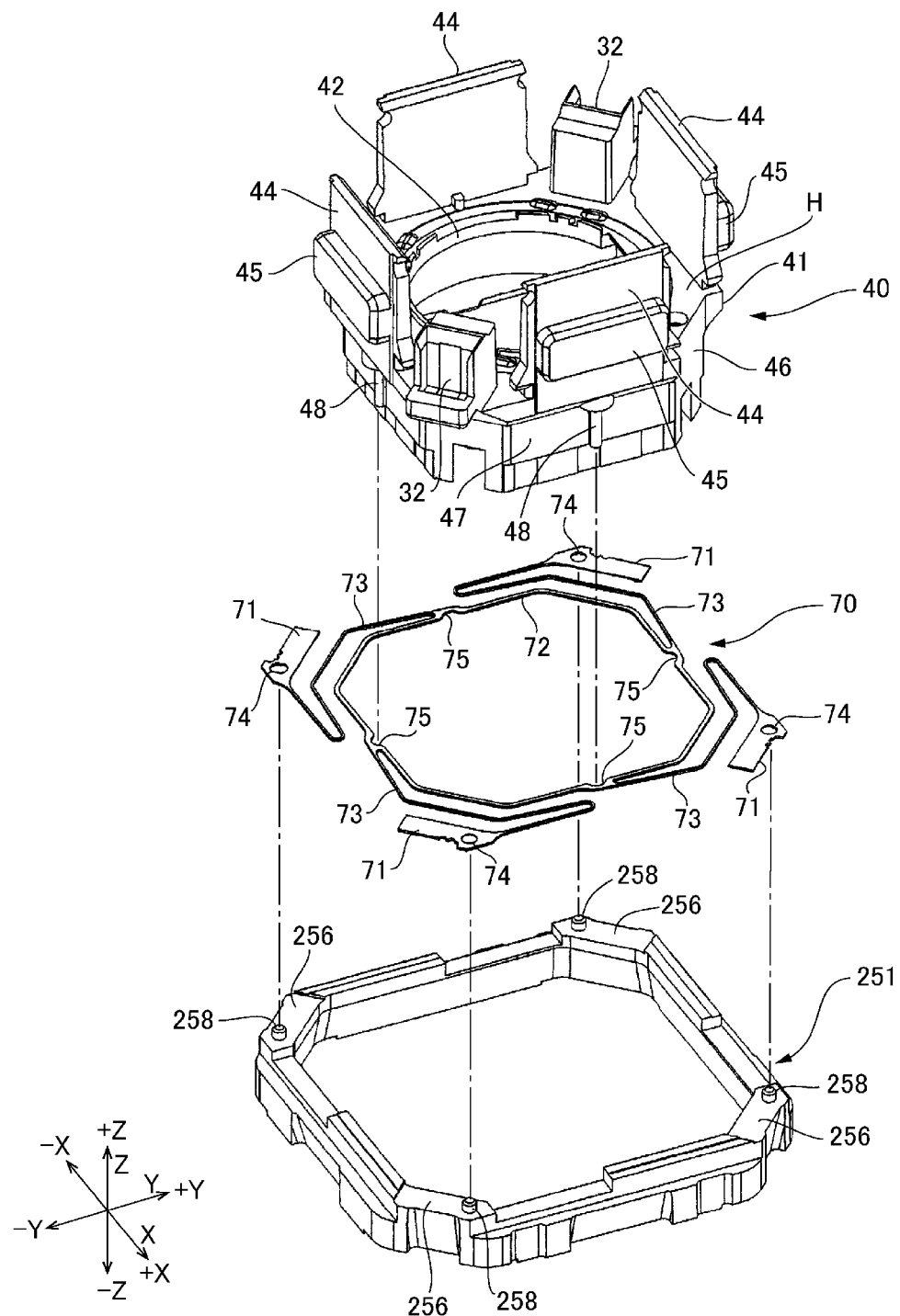
FIG. 5 is an explanatory view showing a connecting method of a movable body with a fixed body through an elastic support member.
Figure 6:
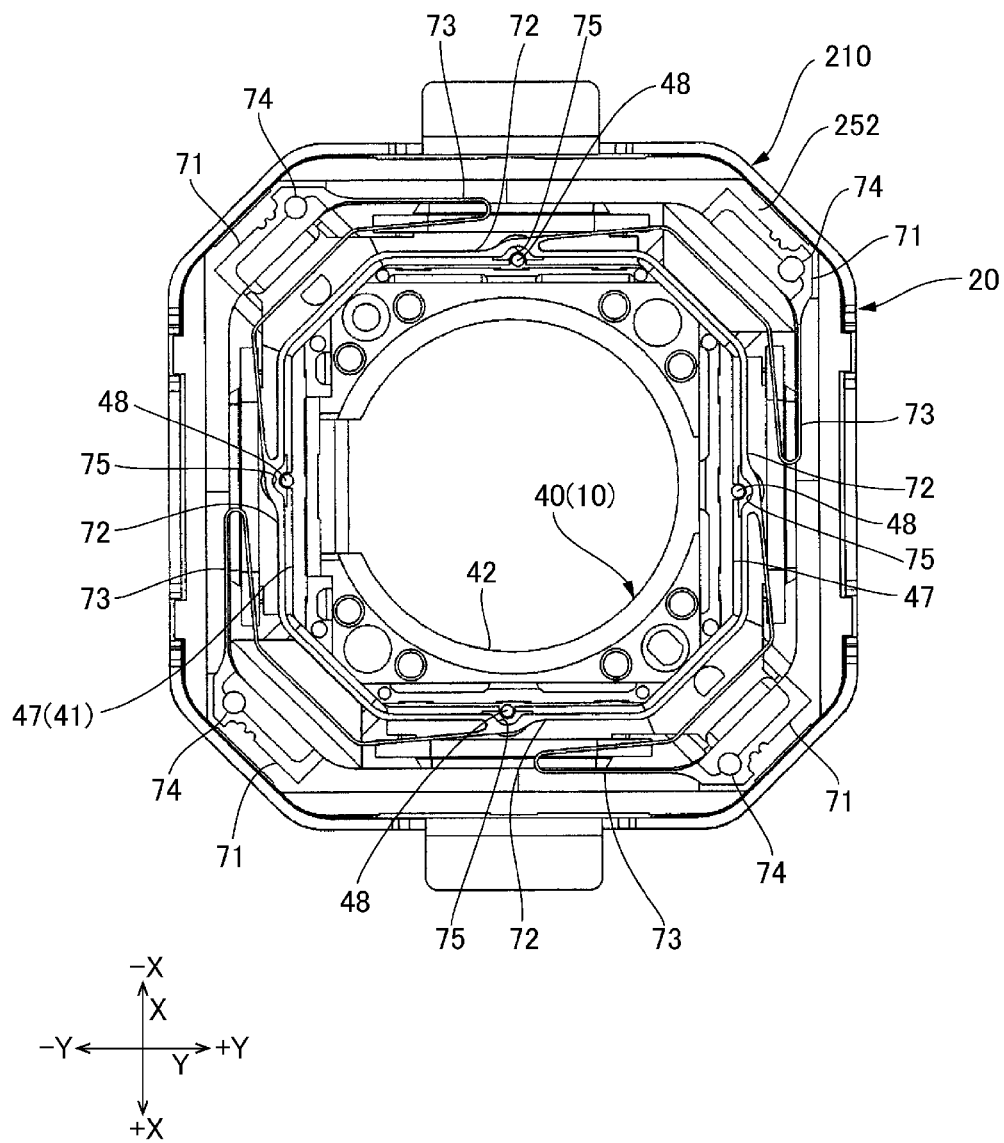
FIG. 6 is an explanatory view showing a connecting method of a movable body with a fixed body through an elastic support member.

FIGS. 5 and 6 are explanatory views showing a connecting method of the movable body 10 with the fixed body 20 through an elastic support member. FIG. 5 is an exploded perspective view showing the holder 40, the elastic support member 70 and the first member 251. FIG. 6 is a bottom view showing the unit 1 with a shake correction function which is viewed from the "−Z" direction side in a state that the first member 251 of the fixed body 20, the stopper 49 of the movable body 10 and the flexible circuit board 80 are detached. As shown in FIG. 2, the elastic support member 70 is disposed at an end part in the "−Z" direction of the fixed body 20 and connects the fixed body 20 with the movable body 10. An attitude of the movable body 10 in a stationary state that the shake correction drive mechanism 50 is not driven is determined by the elastic support member 70.

As shown in FIG. 5, the elastic support member 70 is a plate-shaped spring in a rectangular frame shape which is structured by processing a metal plate. The elastic support member 70 is provided with fixed body side connection parts 71 connected with the fixed body 20, a movable body side connection part 72 connected with the movable body 10, and arm parts 73 which connect the fixed body side connection parts 71 with the movable body side connection part 72. As shown in FIG. 5, the first member 251 is provided with attaching faces 256 which are formed at four corners of an end face which faces the "+Z" direction. Each of four attaching faces 256 is formed with a fixing protruded part 258 which is protruded to the "+Z" direction. The fixed body side connection parts 71 are formed at four corners on an outer peripheral side of the elastic support member 70 and are formed with an engaging hole 74 into which the fixing protruded part 258 is fitted. On the other hand, the movable body side connection part 72 is formed at an inner peripheral edge of the elastic support member 70. The movable body side connection part 72 is a frame-shaped part having a shape along an outer peripheral face of the portion (step part 47) of the movable body 10 which is disposed on an inner peripheral side of the elastic support member 70. The movable body side connection part 72 is provided with recessed parts 75 which are formed at positions corresponding to the fixing protruded parts 48 provided on the step part 47.

(Connecting Structure of Fixed Body and Movable Body Through Elastic Support Member)

The elastic support member 70 is attached to the second case 250 of the fixed body 20 before assembling work of the movable body 10 to the fixed body 20 is performed. First, the elastic support member 70 is attached to the first member 251 from the "+Z" direction side in a state that the first member 251 and the second member 252 are separated from each other. In this case, the engaging holes 74 of the fixed body side connection parts 71 are engaged with the fixing protruded parts 258 to position the elastic support member 70 with respect to the first member 251. After the elastic support member 70 is attached, the first member 251 and the second member 252 are joined to each other to structure the second case 250.

When the movable body 10 is assembled to the fixed body 20, the step part 47 of the movable body 10 is disposed in the opening part 253 of the second case 250. The movable body side connection part 72 of the elastic support member 70 is disposed so as to surround the step part 47 disposed in the opening part 253. In this embodiment, as shown in FIG. 6, the movable body side connection part 72 is a little larger than an outward shape of the step part 47 and a gap space is existed between the outer peripheral face of the step part 47 and the movable body side connection part 72. Further, the recessed part 75 provided in the movable body side connection part 72 and the fixing protruded part 48 provided on the step part 47 are engaged with each other in a state having a gap space therebetween. In other words, when the movable body 10 is assembled to the fixed body 20, the movable body side connection part 72 of the elastic support member 70 is engaged with the movable body 10 in a relatively movable state.

In this embodiment, after the movable body 10 is assembled to the fixed body 20, an attitude (tilt) of the movable body 10 is adjusted in a state that the movable body side connection part 72 is engaged with the movable body 10 in a relatively movable state. The movable body side connection part 72 and the movable body 10 are fixed to each other by using a UV-curing adhesive after a tilt of the movable body 10 has been adjusted.

(Tilt Adjusting Method for Movable Body)

Figure 7A:
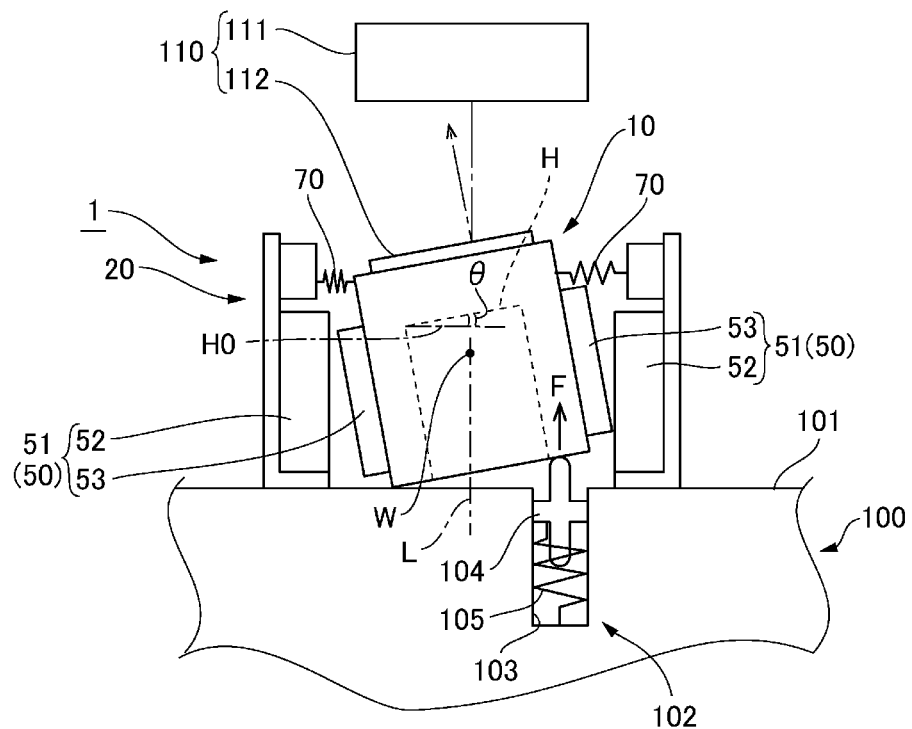
FIGS. 7A and 7B are explanatory views showing a tilt adjusting method for a movable body.
Figure 7B:
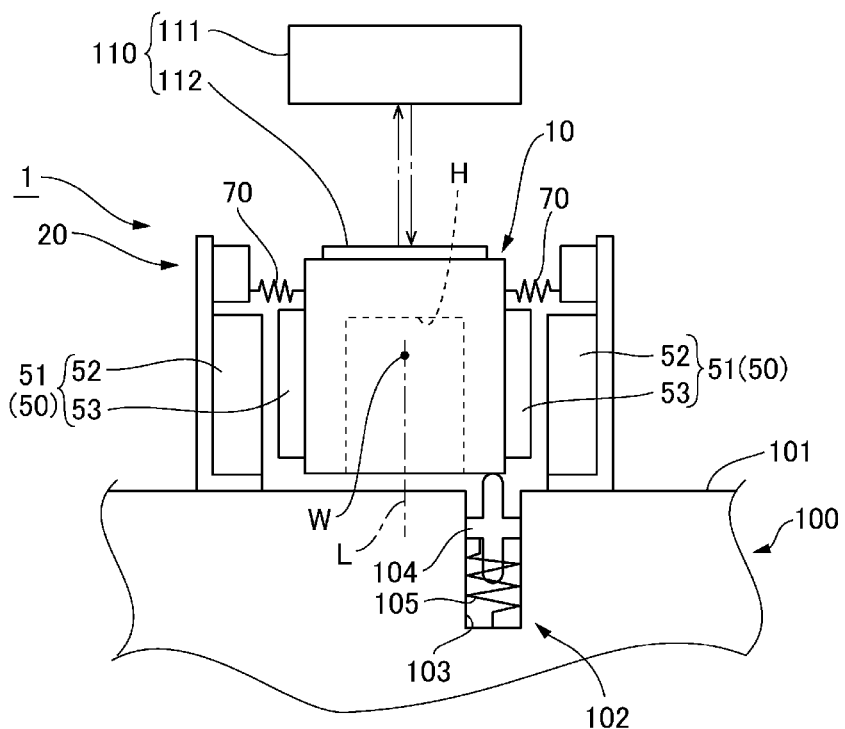

FIGS. 7A and 7B are explanatory views showing a tilt adjusting method for the movable body 10. FIG. 7A shows a state that an unbalanced load is applied to the movable body 10 and FIG. 7B shows a state that a tilt direction of the movable body 10 is set to be coincided with a target direction. In this embodiment, a tilt of the movable body 10 is adjusted so that the optical axis "L0" of the optical module 2 is coincided with the center axial line "L" of the unit 1 with a shake correction function when the optical module 2 is attached to the movable body 10 and, after that, the movable body 10 and the elastic support member 70 are connected with each other by an UV-curing adhesive. As described above, an attitude of the optical module 2 is determined by the reference surface "H" of the movable body 10. Therefore, a tilt of the movable body 10 is adjusted so that the reference surface "H" is directed in a direction (target direction "H0", see FIG. 7A) perpendicular to the center axial line "L".

As shown in FIGS. 7A and 7B, a device structured to adjust a tilt of the movable body 10 includes a restriction part 100 structured to apply an unbalanced load to the movable body 10 to restrict its movement, a tilt measurement part 110 structured to measure a tilt direction of the movable body 10, and a control section 120 structured to control the shake correction drive mechanism 50 based on an output of the tilt measurement part 110 to correct the tilt of the movable body 10. As described above, in this embodiment, the shake correction drive mechanism 50 which is previously provided inside the unit 1 with a shake correction function is used as a drive mechanism for adjusting a tilt of the movable body 10 instead of using another drive mechanism for moving the unit 1 with a shake correction function from the outside.

The restriction part 100 includes a measurement base 101 on which the unit 1 with a shake correction function is placed, and a movable body pressing part 102 provided in the measurement base 101. The movable body pressing part 102 includes a recessed part 103 which is formed in the measurement base 101, a movable member 104 which is movable in an axial line direction of the recessed part 103, and a spring 105 which urges the movable member 104 in a protruding direction from the recessed part 103. The unit 1 with a shake correction function is placed on the measurement base 101 in a state that a side where the elastic support member 70 is attached (in other words, the "−Z" direction side in FIGS. 1 and 2) is located on an upper side. Further, the unit 1 with a shake correction function is placed so that the movable body pressing part 102 presses the movable body 10 at a displaced position from the center axial line "L". In the movable body pressing part 102, the movable member 104 is urged by the spring 105 to press the movable body 10 and, in this manner, the movable body pressing part 102 applies an unbalanced load "F" parallel to the center axial line "L" to the movable body 10.

The gravity center "W" of the movable body 10 is located on the center axial line "L" of the unit 1 with a shake correction function. The movable body pressing part 102 presses the movable body 10 in a direction parallel to the center axial line "L" at a position displaced from the center axial line "L". In other words, the movable body pressing part 102 applies an unbalanced load "F" to the movable body 10 so as to tilt the movable body 10. In this case, the unbalanced load "F" is not required to be a force parallel to the center axial line "L" and may be a force in a direction so as to be capable of tilting the movable body 10. In other words, it is sufficient that the unbalanced load "F" which is applied to the movable body 10 by the movable body pressing part 102 is a force directing to a direction which is different from a direction directing to the gravity center "W" of the movable body 10.

The tilt measurement part 110 includes an autocollimator 111 and a reflection member 112. The autocollimator 111 irradiates measuring light, which is parallel to the center axial line "L" of the unit 1 with a shake correction function placed on the measurement base 101, to the unit 1 with a shake correction function. The reflection member 112 is, for example, a mirror and is attached to the movable body 10 so as to be parallel to the reference surface "H" which is an attaching face of the optical module 2. The tilt measurement part 110 detects reflected light which is reflected by the reflection member 112 by the autocollimator 111 to detect a tilt direction "θ" of the movable body 10 (see FIG. 7A). In this embodiment, a tilt adjustment of the movable body 10 is performed so that the optical axis "L0" (see FIG. 2) of the optical module 2 is intended to coincide with the center axial line "L" of the unit 1 with a shake correction function 1. Therefore, a target direction "H0" which is to be coincided with a tilt direction of the reference surface "H" is a direction perpendicular to the center axial line "L". Accordingly, a tilt of the movable body 10 is adjusted so that "θ"=0.

The movable body 10 is swingably supported around two directions, i.e., around the "X"-axis and around the "Y"-axis by the support mechanism 30. The restriction part 100 applies, as the unbalanced load "F", a first load "F1" for generating a tilt around the "X"-axis and a second load "F2" for generating a tilt around the "Y"-axis to the movable body 10. For example, the measurement base 101 is provided with two movable body pressing parts 102 at angular positions separated by 90 degrees from each other with the center axial line "L" of the unit 1 with a shake correction function placed on the measurement base 101 as a reference. When the movable body pressing part 102 is provided at two positions, a first load "F1" which generates a tilt around the "X"-axis can be applied to the movable body 10 by one of two movable body pressing parts 102. Further, a second load "F2" which generates a tilt around the "Y"-axis can be applied to the movable body 10 by the other of two movable body pressing parts 102.

In accordance with an embodiment of the present invention, the restriction part 100 may be structured so that one movable body pressing part 102 applies a combined load of a first load "F1" and a second load "F2" as an unbalanced load "F". Alternatively, it may be structured that one of a first load "F1" and a second load "F2" is applied to the movable body 10. Further, in a case that the movable body pressing part 102 is provided at two positions, its positional relationship is not limited to an angular position separated by 90 degrees with the center axial line "L" as a reference.

Figure 8:
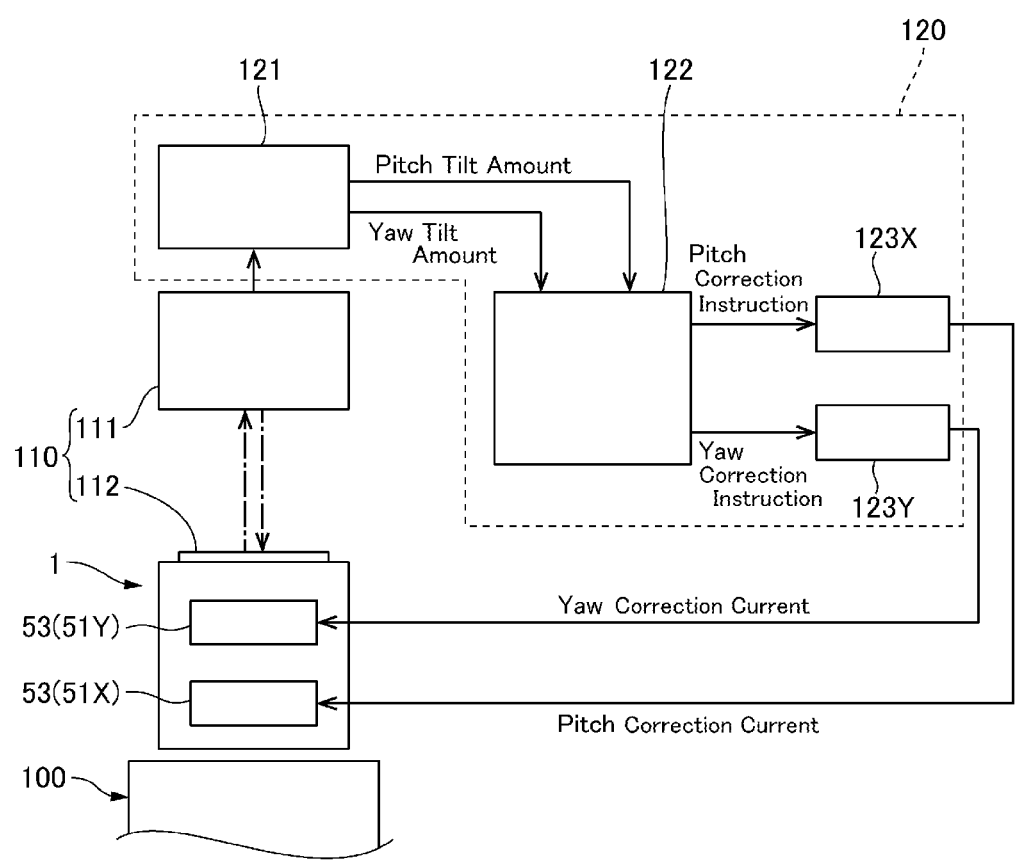
FIG. 8 is a control block diagram for a tilt adjustment of a movable body.

FIG. 8 is a control block diagram for a tilt adjustment of the movable body 10. A control section 120 is provided in a control unit which is connected with the unit 1 with a shake correction function placed on the measurement base 101 and the autocollimator 111. The control section 120 includes a tilt amount calculation circuit 121, a driving force calculation circuit 122, and drive current control circuits 123X and 123Y. In a case that the restriction part 100 applies unbalanced loads of two directions, i.e., around the "X"-axis and around the "Y"-axis to the movable body 10 as described above, a tilt which is measured by the autocollimator 111 becomes a combined amount of a tilt amount around the "X"-axis and a tilt amount around the "Y"-axis. The tilt amount calculation circuit 121 obtains a tilt amount around the "X"-axis ("Pitch" tilt amount) and a tilt amount around the "Y"-axis ("Yaw" tilt amount) of the movable body 10 from an output of the autocollimator 111. The tilt amount calculated by the tilt amount calculation circuit 121 is, for example, obtained so that a deviated amount of a tilt direction of a current reference surface "H" with respect to the target direction "H0" is divided into an "X"-axis direction component and a "Y"-axis direction component.

The driving force calculation circuit 122 obtains drive amounts of the first magnetic drive mechanism 51X and the second magnetic drive mechanism 51Y for making the tilt direction of the movable body 10 coincide with the target direction "H0" based on the tilt amounts around the "X"-axis and the "Y"-axis calculated by the tilt amount calculation circuit 121. Specifically, the drive amounts obtained in the driving force calculation circuit 122 are current values (correction current) which are to be supplied to the coils 53 of the first magnetic drive mechanism 51X and the second magnetic drive mechanism 51Y. The driving force calculation circuit 122 supplies, as an instruction signal for supplying the obtained correction current, a "Pitch" correction instruction to a drive current control circuit 123X for controlling a power feeding amount of the coils 53 of the first magnetic drive mechanism 51X. Further, the driving force calculation circuit 122 supplies a "Yaw" correction instruction to a drive current control circuit 123Y for controlling a power feeding amount of the coils 53 of the second magnetic drive mechanism 51Y.

(Tilt Adjustment of Movable Body)

Figure 9:
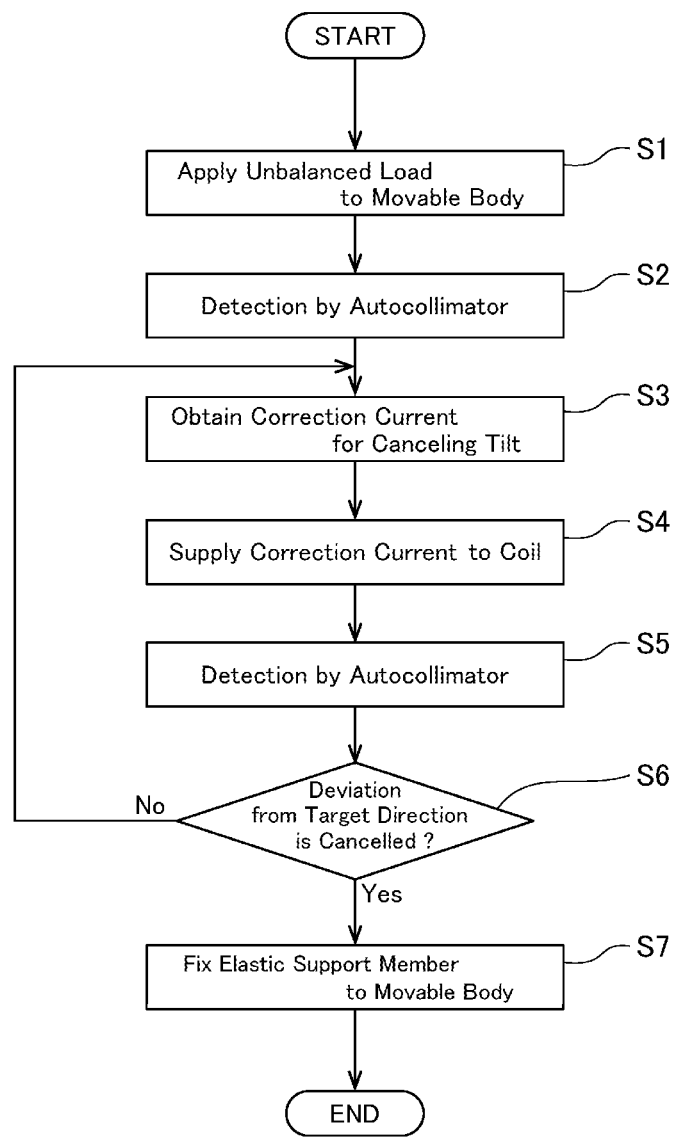
FIG. 9 is a flow chart of a tilt adjusting method for a movable body.

FIG. 9 is a flow chart of a tilt adjusting method for the movable body 10 and shows a process in which a tilt adjustment of the movable body 10 is performed and, after that, the fixed body 20 and the movable body 10 are connected with each other through the elastic support member 70. First, before a tilt adjustment of the movable body 10 is started, an elastic support member 70 is attached to the fixed body 20 and then the movable body 10 is assembled to the fixed body 20. A state of the unit 1 with a shake correction function before a tilt adjustment is started is, as described above in the attaching method of the elastic support member 70, a state that the fixed body side connection parts 71 of the elastic support member 70 are fixed to the fixed body 20 and, in addition, the movable body side connection part 72 is engaged with the movable body 10 in a relatively movable state.

In the step "S1" (first process), an unbalanced load "F" is applied to the unit 1 with a shake correction function by the restriction part 100. Specifically, the unit 1 with a shake correction function is placed on the measurement base 101 and a first load "F1" for generating a tilt around the "X"-axis and a second load "F2" for generating a tilt around the "Y"-axis are applied to the movable body 10 by the movable body pressing parts 102 provided at two positions.

In the steps "S2" through "S6" (second process), the control section 120 controls the shake correction drive mechanism 50 to automatically adjust a tilt direction of the reference surface "H" of the movable body 10 so as to coincide with the target direction "H0". First, in the step "S2", the autocollimator 111 detects a tilt amount of the movable body 10 and outputs tilt amounts for respective directions around the "X"-axis and around the "Y"-axis ("Pitch" tilt amount and "Yaw" tilt amount) to the control section 120. The tilt amount detected in the step "S2" is a deviated amount with respect to the target direction "H0". Then, in the step "S3", processing for obtaining a "Pitch" correction instruction and a "Yaw" correction instruction is performed in the driving force calculation circuit 122 based on the tilt amounts around the "X"-axis and around the "Y"-axis. Next, in the step "S4", processing is performed in which correction currents are supplied to the coils 53 of the first magnetic drive mechanism 51X and the coils 53 of the second magnetic drive mechanism 51Y by the drive current control circuit 123X and the drive current control circuit 123Y which are received with the "Pitch" correction instruction and the "Yaw" correction instruction.

The correction currents are supplied in the step "S4", magnetic-drive forces are applied to the movable body 10 by the first magnetic drive mechanism 51X and the second magnetic drive mechanism 51Y. The magnetic-drive force generated by the correction current is a force in a direction opposite to the unbalanced load "F". Therefore, the movable body 10 is swung in a direction eliminating the tilt due to the unbalanced load "F", and the tilt of the movable body 10 is corrected by the angle according to the correction current.

In the step "S5", similarly to the step "S2", the autocollimator 111 detects a tilt amount of the movable body 10. Successively, the step "S6" is performed and, in this step, it is determined whether a tilt amount for each direction is larger than an allowable value or not. When it is determined that the deviation is larger than the allowable value (step "S6": "No"), the flow is returned to the step "S3". The control section 120 performs feedback control which repeats the steps "S3" through "S6" until the deviation with respect to the target direction "H0" becomes lower than the allowable value.

When the control section 120 determines that the tilt amount is not more than the allowable value (step "S6": "Yes"), the control section 120 performs the step "S7". In the step "S7" (connection process), the movable body side connection part 72 which is engaged with the movable body 10 in a relatively movable state is fixed to the movable body 10 and thereby the movable body 10 and the fixed body 20 are connected with each other through the elastic support member 70. Specifically, a UV-curing adhesive is applied to the portion where the recessed part 75 of the movable body side connection part 72 and the fixing protruded part 48 of the movable body 10 are engaged with each other and, after that, a UV light is irradiated to cure the UV-curing adhesive. While the UV-curing adhesive is applied and the curing processing is performed, the control section 120 controls the shake correction drive mechanism 50 so that the magnetic-drive force around the "X"-axis and the magnetic-drive force around the "Y"-axis applied to the movable body 10 by the first magnetic drive mechanism 51X and the second magnetic drive mechanism 51Y are maintained in the balanced state with the first load "F1" and the second load "F2" applied to the movable body 10 by the restriction part 100.

After the curing processing of the UV-curing adhesive is completed and connection of the movable body 10 with the fixed body 20 through the elastic support member 70 is completed, the reflection member 112 is detached from the unit 1 with a shake correction function and the unit 1 with a shake correction function is detached from the measurement base 101.

(Operations and Effects)

As described above, in a tilt adjusting method for the movable body 10 in this embodiment, the shake correction drive mechanism 50 provided in an inside of the unit 1 with a shake correction function for performing a shake correction of the movable body 10 is used to make a tilt direction of the reference surface "H" of the movable body 10 coincide with the target direction "H0" and, in a state that the tilt direction of the reference surface "H" of the movable body 10 is coincided with the target direction "H0", the elastic support member 70 and the movable body 10 are fixed to each other. In this case, first, a restriction is applied to movement of the movable body 10. Specifically, an unbalanced load "F" (first load "F1" and second load "F2") is applied to the movable body 10 to make the movable body 10 in a tilt state so that a driving force according to the unbalanced load "F" is required for moving the movable body 10. In other words, the state is that the unbalanced load "F" is acted on the movable body 10 so that a force having a component in an opposite direction to a driving force of the shake correction drive mechanism 50 is applied. Then, in this state, the shake correction drive mechanism 50 is driven to perform a tilt adjustment of the movable body 10. According to this method, when a driving force of the shake correction drive mechanism 50 is applied, the movable body 10 is prevented from being largely moved by a small force and thus variation of a tilt of the movable body 10 is restrained. Therefore, a tilt adjustment of the movable body 10 can be performed with a high degree of accuracy. Further, a tilt adjustment of the movable body 10 is performed by the shake correction drive mechanism 50 provided in an inside of the unit 1 with a shake correction function and thus, in comparison with a method in which the movable body 10 is moved by using an external drive mechanism, factors which cause variation of a tilt of the movable body 10 can be reduced. Therefore, a tilt adjustment of the movable body 10 is stably performed with a high degree of accuracy.

In this embodiment, movement of the movable body 10 is restricted by applying an unbalanced load to the movable body 10. For example, a spring load is applied as an unbalanced load. Movement of the movable body 10 is restricted by utilizing a spring with a simple structure. Therefore, when a restoring force is applied by the shake correction drive mechanism 50, the movable body 10 is prevented from being moved largely with a small force and thus a tilt of the movable body 10 can be restrained from being dispersed. Accordingly, a tilt adjustment of the movable body 10 can be performed with a high degree of accuracy.

In this embodiment, during the process in which the elastic support member 70 and the movable body 10 are fixed to each other by an UV-curing adhesive, a state is maintained in which the first load "F1" and the second load "F2" applied to the movable body 10 by the restriction part 100 are balanced with the magnetic-drive force around the "X"-axis and the magnetic-drive force around the "Y"-axis applied to the movable body 10 by the first magnetic drive mechanism 51X and the second magnetic drive mechanism 51Y. Therefore, while fixing is performed by the UV-curing adhesive, a fixing position is restrained from being displaced due to variation of a force applied to the fixed portion. Accordingly, a tilt adjustment of the movable body 10 can be performed with a high degree of accuracy.

In this embodiment, a tilt of the movable body 10 is detected by using an autocollimator 111. When an optical type tilt measuring method is used, in comparison with a contact type tilt measuring method, factors causing a positional displacement of the movable body 10 can be reduced. Therefore, a tilt adjustment of the movable body 10 can be performed with a high degree of accuracy.

In this embodiment, feedback control is performed in which a drive current supplied to the coil 53 is repeatedly adjusted based on an output of the autocollimator 111 until a tilt direction of the movable body 10 and the target direction are substantially coincided with each other. Therefore, a tilt direction of the reference surface "H" of the movable body 10 can be coincided with the target direction "H0" through automatic adjustment and a tilt adjustment of the movable body 10 can be performed easily.

MODIFIED EMBODIMENTS

Figure 10A:
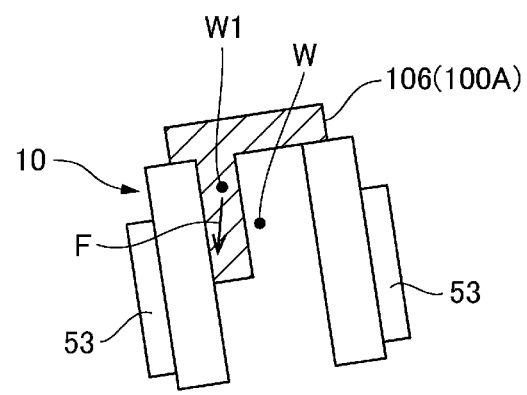
FIGS. 10A and 10B are explanatory views showing modified embodiments of a method for applying an unbalanced load to a movable body.
Figure 10B:
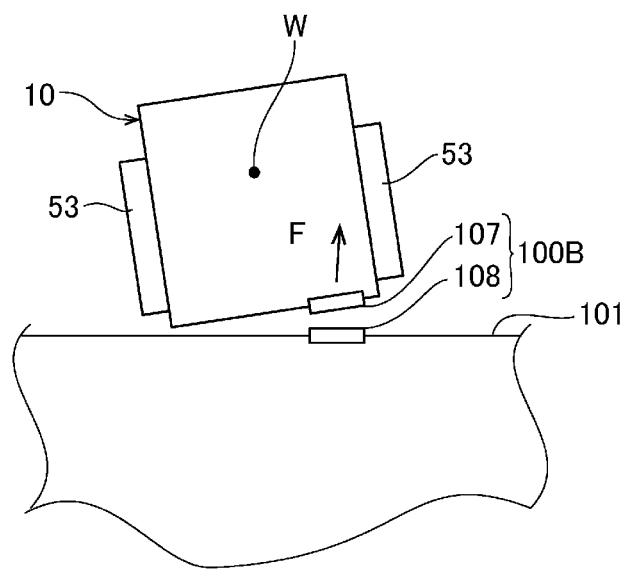

The restriction part 100 in the embodiment described above utilizes a spring force for applying an unbalanced load "F" to the movable body 10. However, another means may be used for applying an unbalanced load "F". FIGS. 10A and 10B are explanatory views showing modified embodiments of the restriction part 100. FIG. 10A is a view showing a modified embodiment in which a weight is used and FIG. 10B is a view showing a modified embodiment in which a repulsive force of magnets is used. As shown in FIG. 10A, a restriction part 100A in a first modified embodiment 1 is provided with a weight 106 which is placed on the movable body 10. A gravity center "W1" of the weight 106 is located at a position displaced from the center axial line "L" of the unit 1 with a shake correction function in a state that the weight 106 is attached to the movable body 10. Therefore, a load applied to the movable body 10 by the weight 106 is an unbalanced load and thus, similarly to the embodiment described above, a tilt adjustment can be performed in a state that the movable body 10 is inclined.

As shown in FIG. 10B, a restriction part 100B in a second modified embodiment includes a first magnet 107 attached to the movable body 10 and a second magnet 108 attached to the measurement base 101. The first magnet 107 and the second magnet 108 are magnets having the same pole and are disposed at positions displaced from the center axial line "L" of the unit 1 with a shake correction function. The restriction part 100B in the second modified embodiment is capable of applying an unbalanced load "F" to the movable body 10 by a repulsive force acted between the first magnet 107 and the second magnet 108. Alternatively, the first magnet 107 and the second magnet 108 may be magnets having different poles. In this case, an unbalanced load "F" can be applied to the movable body 10 by an attraction force acted between the first magnet 107 and the second magnet 108. Therefore, in both cases, similarly to the embodiment described above, an unbalanced load "F" can be applied to the movable body 10.

OTHER EMBODIMENTS

In the embodiment described above, the present invention is applied to a unit with a shake correction function in which a gimbal mechanism is used as a support mechanism structured to swingably support the movable body around the "X"-axis and around the "Y"-axis. However, at least an embodiment of the present invention may be applied to a unit with a shake correction function in which a pivot mechanism is used as the support mechanism.

In the embodiment described above, a tilt direction of the movable body 10 is detected by using an autocollimator 111. However, a tilt direction of the movable body 10 may be detected by another method. For example, a contact type detection mechanism may be used. Alternatively, it may be structured that a displacement of the movable body 10 is detected by using a laser displacement meter and a tilt direction is obtained based on a detected displacement amount.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A tilt adjusting method for a movable body in a unit with a shake correction function comprising a movable body, a fixed body provided with a support mechanism structured to swingably support the movable body, a shake correction drive mechanism structured to swing the movable body with respect to the fixed body, and an elastic support member which connects the movable body with the fixed body, the tilt adjusting method for the movable body comprising:
   a first process comprising setting a state that a force having a component on an opposite direction to a driving force of the shake correction drive mechanism is acted on the movable body;
   a second process comprising adjusting the driving force so that a tilt direction of the movable body is substantially coincided with a target direction; and
   a third process comprising connecting the movable body with the fixed body through the elastic support member in a state that the tilt direction of the movable body is substantially coincided with the target direction.

2. The tilt adjusting method for the movable body according to claim 1, wherein in the first process, an unbalanced load is applied to the movable body in a direction different from a direction directing to a gravity center of the movable body.

3. The tilt adjusting method for the movable body according to claim 2, wherein in the first process, a spring load is applied to the movable body.

4. The tilt adjusting method for the movable body according to claim 2, wherein in the first process, a load of a weight is applied to the movable body.

5. The tilt adjusting method for the movable body according to claim 2, wherein in the first process, a repulsive force or an attraction force which is acted between a first magnet held by the movable body and a second magnet which faces the first magnet is applied to the movable body.

6. The tilt adjusting method for the movable body according to claim 2, wherein in the third process, the movable body and the elastic support member are fixed to each other by using a UV-curing adhesive and, while the UV-curing adhesive is applied and curing processing for the UV-curing adhesive is performed, the shake correction drive mechanism is controlled so as to maintain a state that the unbalanced load and the driving force are balanced with each other.

7. The tilt adjusting method for the movable body according to claim 1, wherein in the second process, the tilt direction of the movable body is measured by detecting a measurement light reflected by the movable body.

8. The tilt adjusting method for the movable body according to claim 1, wherein
   the shake correction drive mechanism comprises a coil and a magnet, and
   in the second process, the tilt direction of the movable body is measured and, based on a deviation between the tilt direction being measured and the target direction, feedback control which controls a drive current supplied to the coil is performed.

9. The tilt adjusting method for the movable body according to claim 8, wherein
   in the first process, an unbalanced load is applied to the movable body in a direction different from a direction directing to a gravity center of the movable body to tilt the movable body,
   in the second process, the driving force is applied to the movable body by the shake correction drive mechanism in a direction opposite to the tilt direction due to the unbalanced load of the movable body to adjust so that the tilt direction of the movable body is substantially coincided with the target direction, and
   in the third process, the movable body and the elastic support member are fixed to each other in a state that movement of the movable body is restricted by the unbalanced load applied in the first process and the driving force of the shake correction drive mechanism applied in the second process.

10. The tilt adjusting method for the movable body according to claim 9, wherein in the first process, one of that a spring load is applied to the movable body, that a load of a weight is applied to the movable body, and that a repulsive force or an attraction force which is acted between a first magnet held by the movable body and a second magnet which faces the first magnet is applied to the movable body is performed.

11. The tilt adjusting method for the movable body according to claim 9, wherein in the third process, the movable body and the elastic support member are fixed to each other by using a UV-curing adhesive and, while the UV-curing adhesive is applied and curing processing for the UV-curing adhesive is performed, the shake correction drive mechanism is controlled so as to maintain a state that the unbalanced load and the driving force are balanced with each other.

12. The tilt adjusting method for the movable body according to claim 8, wherein in the second process, the tilt direction of the movable body is measured by detecting a measurement light reflected by the movable body.

13. The tilt adjusting method for the movable body according to claim 1, wherein
- the support mechanism swingably supports the movable body in a swing direction around a first direction intersecting a center axial line of the fixed body and a swing direction around a second direction intersecting the center axial line and the first direction,
- the shake correction drive mechanism comprises a first drive mechanism structured to swing the movable body around the first direction and a second drive mechanism structured to swing the movable body around the second direction,
- in the first process, at least one of a first load which tilts the movable body around the first direction and a second load which tilts the movable body around the second direction is applied to the movable body to tilt the movable body,
- in the second process, the first drive mechanism and the second drive mechanism are controlled to adjust a tilt direction around the first direction of the movable body and a tilt direction around the second direction so that the tilt direction of the movable body is substantially coincided with the target direction, and
- in the third process, the elastic support member is attached so as to support the movable body in a relatively movable state in the first direction and the second direction with respect to the fixed body.

14. The tilt adjusting method for the movable body according to claim 13, wherein in the first process, one of that a spring load is applied to the movable body, that a load of a weight is applied to the movable body, and that a repulsive force or an attraction force which is acted between a first magnet held by the movable body and a second magnet which faces the first magnet is applied to the movable body is performed.

15. The tilt adjusting method for the movable body according to claim 13, wherein in the third process, the movable body and the elastic support member are fixed to each other by using a UV-curing adhesive and, while the UV-curing adhesive is applied and curing processing for the UV-curing adhesive is performed, the shake correction drive mechanism is controlled so as to maintain a state that the unbalanced load and the driving force are balanced with each other.

16. The tilt adjusting method for the movable body according to claim 13, wherein in the second process, the tilt direction of the movable body is measured by detecting a measurement light reflected by the movable body.

* * * * *